US012352772B2

(12) United States Patent
Joji

(10) Patent No.: US 12,352,772 B2
(45) Date of Patent: Jul. 8, 2025

(54) AUTOMATIC ANALYZER WITH A CONTROLLER CAPABLE OF DETERMINING THE PRESENCE OF EMPTY CONTAINERS ON A CONTAINER RETAINING MECHANISM

(71) Applicant: Hitachi High-Tech Corporation, Tokyo (JP)

(72) Inventor: Akira Joji, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 937 days.

(21) Appl. No.: 17/594,436

(22) PCT Filed: Jan. 22, 2020

(86) PCT No.: PCT/JP2020/002083
§ 371 (c)(1),
(2) Date: Oct. 15, 2021

(87) PCT Pub. No.: WO2020/235134
PCT Pub. Date: Nov. 26, 2020

(65) Prior Publication Data
US 2022/0178960 A1     Jun. 9, 2022

(30) Foreign Application Priority Data
May 21, 2019   (JP) .................................. 2019-095250

(51) Int. Cl.
*G01N 35/10*   (2006.01)
*G01N 35/00*   (2006.01)
*G01N 27/22*   (2006.01)

(52) U.S. Cl.
CPC ... *G01N 35/1009* (2013.01); *G01N 35/00623* (2013.01); *G01N 35/00712* (2013.01); *G01N 27/22* (2013.01)

(58) Field of Classification Search
CPC ......... G01N 35/1009; G01N 35/00584; G01N 35/00594; G01N 35/00613;
(Continued)

(56) References Cited

U.S. PATENT DOCUMENTS

| 5,215,714 A | 6/1993 | Okada et al. |
| 2008/0019868 A1* | 1/2008 | Okumoto ............... G01N 21/31 422/63 |

(Continued)

FOREIGN PATENT DOCUMENTS

| EP | 0 977 038 A2 | 2/2000 |
| JP | 08313538 A * | 11/1996 |

(Continued)

OTHER PUBLICATIONS

International Search Report (PCT/ISA/210) issued in PCT Application No. PCT/JP2020/002083 dated Mar. 24, 2020 with English translation (four (4) pages).

(Continued)

*Primary Examiner* — Arlen Soderquist
(74) *Attorney, Agent, or Firm* — Crowell & Moring LLP

(57) ABSTRACT

There is provided a technique that can efficiently control disposal and use of containers of an automatic analyzer. An automatic analyzer includes a controller, a container retaining mechanism (incubator), a dispensing mechanism, a detection mechanism, and a transfer mechanism. The dispensing mechanism includes a liquid surface detection mechanism. The controller uses the dispensing mechanism at a prescribed timing to detect the presence or absence of the liquid surface at a target position on the container retaining mechanism to determine a state including the presence or absence of the container accommodating a reaction solution. The controller performs control in which the operation of disposal using the transfer mechanism is (Continued)

performed at a position when a state is determined in which the container is present, and the operation of disposal using the transfer mechanism is not performed at the position when a state is determined in which the container is not present.

7 Claims, 10 Drawing Sheets

(58) Field of Classification Search
CPC ... G01N 35/00623; G01N 2035/00643; G01N 35/00663; G01N 35/00712; G01N 35/02; G01N 2035/023; G01N 35/025; G01N 35/026; G01N 2035/0401; G01N 35/04; G01N 2035/0437; G01N 2035/0444; G01N 2035/0465; G01N 35/1004; G01N 35/1025
USPC .................................. 422/63–67; 436/43–50
See application file for complete search history.

(56) References Cited

U.S. PATENT DOCUMENTS

| | | | |
|---|---|---|---|
| 2008/0233012 A1* | 9/2008 | Zander | G01N 35/00732 422/400 |
| 2009/0041628 A1* | 2/2009 | Kakizaki | G01N 35/1004 422/68.1 |
| 2009/0068062 A1 | 3/2009 | Jafari et al. | |
| 2009/0215183 A1* | 8/2009 | Takehara | G01N 35/00623 422/67 |
| 2009/0292492 A1* | 11/2009 | Nishida | G01N 35/00623 702/85 |
| 2010/0112704 A1* | 5/2010 | Tsuda | B01F 35/2209 422/62 |
| 2012/0087830 A1* | 4/2012 | Wakamiya | G01N 35/0092 422/67 |
| 2012/0251391 A1 | 10/2012 | Hagiwara et al. | |
| 2013/0034466 A1* | 2/2013 | Wakamiya | G01N 35/0092 422/63 |
| 2013/0129166 A1* | 5/2013 | Muller | B01L 3/502761 382/128 |
| 2015/0104351 A1* | 4/2015 | Makino | G01N 35/025 422/64 |
| 2015/0114123 A1 | 4/2015 | Schaefer et al. | |
| 2015/0212102 A1 | 7/2015 | Hagiwara et al. | |
| 2016/0327587 A1 | 11/2016 | Yasui et al. | |
| 2016/0349278 A1 | 12/2016 | Johns et al. | |
| 2017/0328925 A1* | 11/2017 | Sano | G01N 1/38 |
| 2017/0350912 A1* | 12/2017 | Maetzler | G01N 35/04 |
| 2020/0233001 A1* | 7/2020 | Hashimoto | G01N 35/1011 |

FOREIGN PATENT DOCUMENTS

| | | | |
|---|---|---|---|
| JP | 2761385 B2 | | 6/1998 |
| JP | 11-352131 A | | 12/1999 |
| JP | 2000-346853 A | | 12/2000 |
| JP | 2007316010 A | * | 12/2007 |
| JP | 2010-96638 A | | 4/2010 |
| JP | 2013174469 A | * | 9/2013 |
| JP | 2014119329 A | * | 6/2014 |
| JP | 2015-175783 A | | 10/2015 |
| WO | WO 2011/078118 A1 | | 6/2011 |

OTHER PUBLICATIONS

Extended European Search Report issued in European Application No. 20 80 8286.7 dated Feb. 28, 2023 (11 pages).

* cited by examiner

1: INCUBATOR
2: REACTION CONTAINER
3: SHARED DISK
8, 9: DISPENSING MECHANISM
17: TRANSFER MECHANISM
20: REACTION CONTAINER TRAY
21: DISPOSAL BOX
100: CONTROLLER

FIG. 5A

CONTAINER STATUS DETERMINATION

| LIQUID SURFACE DETECTION | NOT DETECTED (LIQUID IS PRESENT) | (1) NO REACTION CONTAINER IS PRESENT |
|---|---|---|
| | DETECTED (NO LIQUID IS PRESENT) | (3) USED REACTION CONTAINER IS PRESENT |

FIG. 5B

DISPOSAL CONTROL

| LIQUID SURFACE DETECTION | NOT DETECTED | [DISPOSAL CONTROL] DISPOSAL OPERATION IS NOT PERFORMED AT TARGET POSITION<br>[IN SUBSEQUENT ANALYSIS] TRANSFER MECHANISM ACQUIRES UNUSED REACTION CONTAINER FROM TRAY AND LOADS USED REACTION CONTAINER AT TARGET POSITION |
|---|---|---|
| | DETECTED | [DISPOSAL CONTROL]<br>· TARGET POSITION OF INCUBATOR IS MOVED AT POSITION TO WHICH TRANSFER MECHANISM CAN HAVE ACCESS<br>· TRANSFER MECHANISM TRANSFERS USED REACTION CONTAINER AT TARGET POSITION TO DISPOSAL BOX AND DISPOSES OF USED REACTION CONTAINER<br>[IN SUBSEQUENT ANALYSIS] TRANSFER MECHANISM ACQUIRES UNUSED REACTION CONTAINER FROM TRAY AND LOADS USED REACTION CONTAINER AT TARGET POSITION |

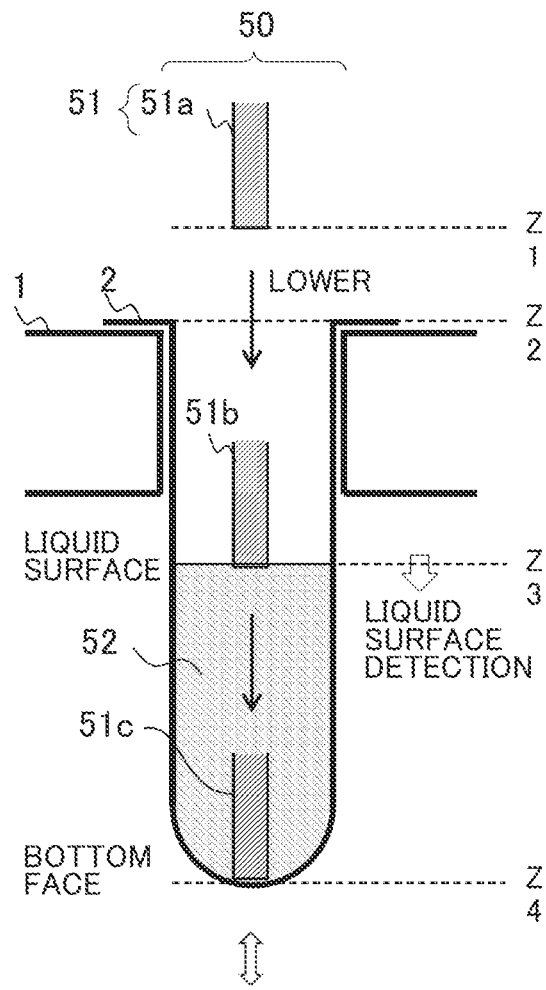

FIG. 8A
CONTAINER STATUS DETERMINATION

|  |  | ABNORMAL LOWERING DETECTION ||
|---|---|---|---|
|  |  | NOT DETECTED (NO CONTAINER IS PRESENT) | DETECTED (CONTAINER IS PRESENT) |
| LIQUID SURFACE DETECTION | NOT DETECTED (NO LIQUID IS PRESENT) | (1) NO REACTION CONTAINER IS PRESENT | (2) UNUSED REACTION CONTAINER IS PRESENT |
|  | DETECTED (LIQUID IS PRESENT) | (3) USED REACTION CONTAINER IS PRESENT ||

FIG. 8B
DISPOSAL CONTROL

|  |  | ABNORMAL LOWERING DETECTION ||
|---|---|---|---|
|  |  | NOT DETECTED | DETECTED |
| LIQUID SURFACE DETECTION | NOT DETECTED | [DISPOSAL CONTROL] DISPOSAL OPERATION IS NOT PERFORMED AT TARGET POSITION [IN SUBSEQUENT ANALYSIS] TRANSFER MECHANISM ACQUIRES USED REACTION CONTAINER FROM TRAY AND LOADS USED REACTION CONTAINER AT TARGET POSITION | [DISPOSAL CONTROL] DISPOSAL OPERATION IS NOT PERFORMED AT TARGET POSITION [IN SUBSEQUENT ANALYSIS] REACTION CONTAINER LOADED AT TARGET POSITION IS USED (NEW REACTION CONTAINER IS NOT TRANSFERRED) |
|  | DETECTED | [DISPOSAL CONTROL] • TARGET POSITION OF INCUBATOR IS MOVED AT POSITION TO WHICH TRANSFER MECHANISM CAN HAVE ACCESS • TRANSFER MECHANISM TRANSFERS USED REACTION CONTAINER AT TARGET POSITION TO DISPOSAL BOX AND DISPOSES OF USED REACTION CONTAINER [IN SUBSEQUENT ANALYSIS] TRANSFER MECHANISM ACQUIRES UNUSED REACTION CONTAINER FROM TRAY AND LOADS USED REACTION CONTAINER AT TARGET POSITION ||

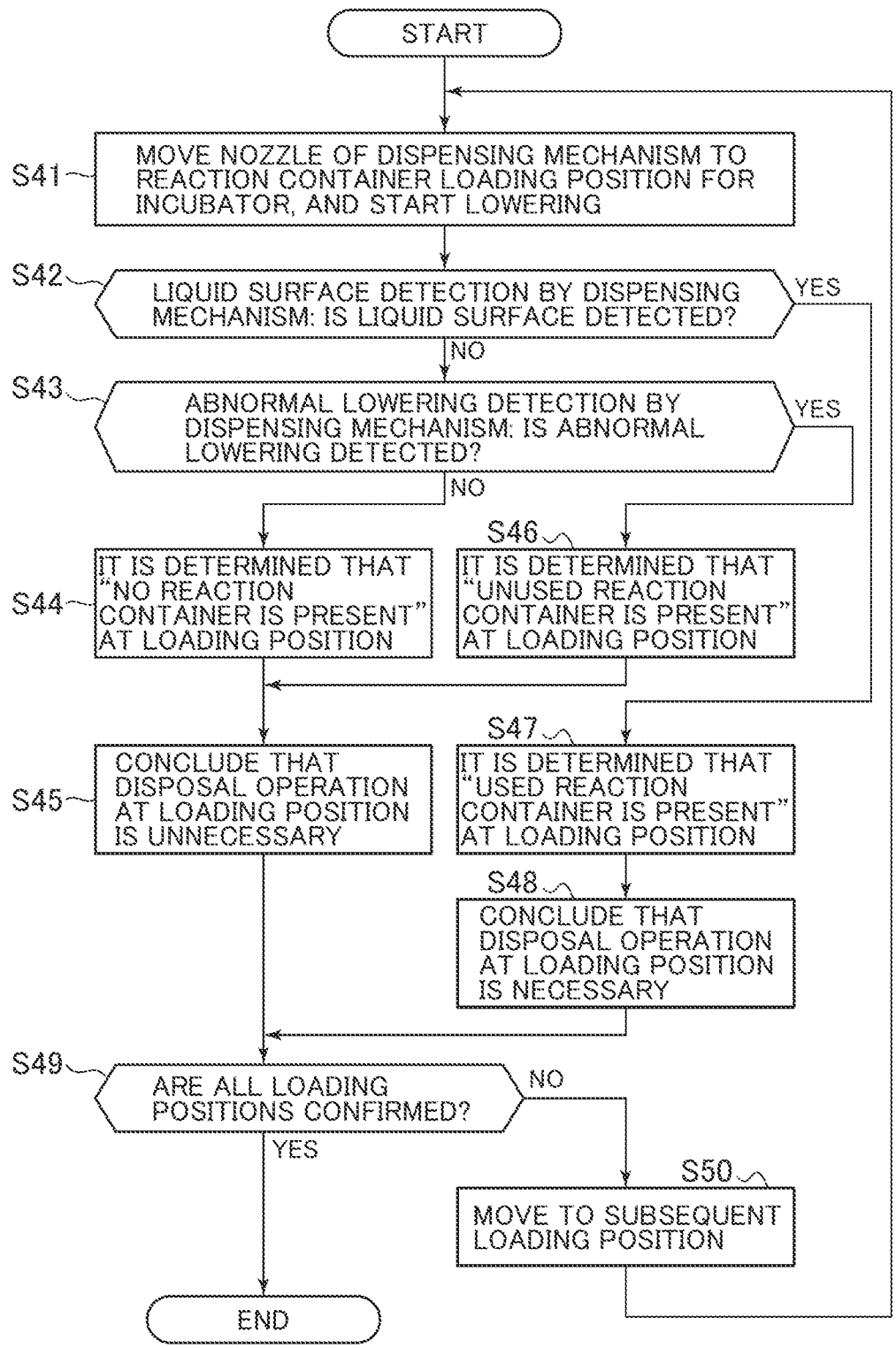

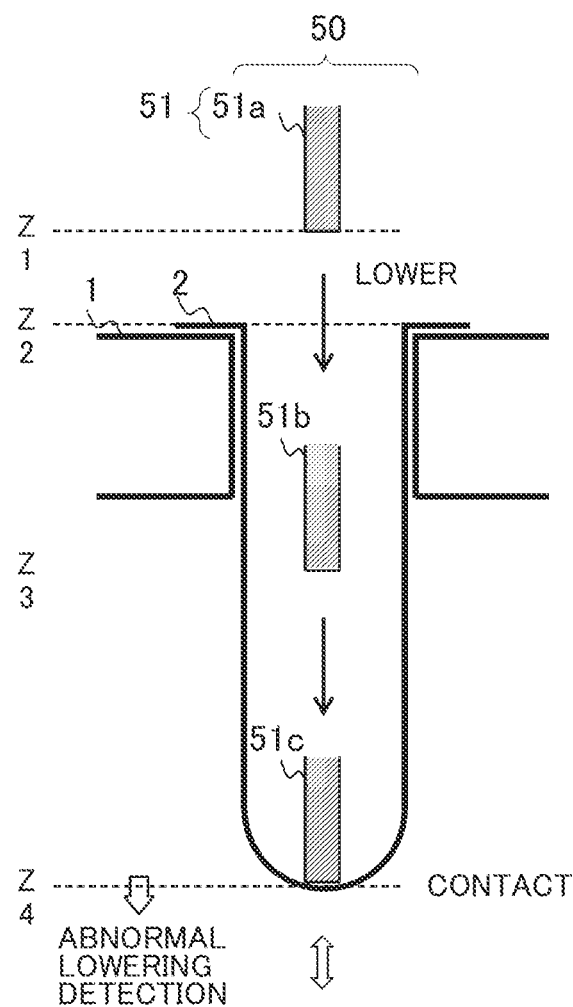

AUTOMATIC ANALYZER WITH A CONTROLLER CAPABLE OF DETERMINING THE PRESENCE OF EMPTY CONTAINERS ON A CONTAINER RETAINING MECHANISM

TECHNICAL FIELD

The present invention relates to an automatic analyzer.

BACKGROUND ART

An automatic analyzer for clinical examination is essential for current diagnosis since reproducibility of a result of analysis by the automatic analyzer is high and a processing speed of the automatic analyzer is high. This automatic analyzer analyzes a reaction solution prepared by dispensing a sample and a reagent into a reaction container. As analysis methods by this automatic analyzer, there are colorimetric analysis, immunoassay, and the like. The colorimetric analysis is an analysis method using a reagent that reacts with an analysis target component contained in a sample such that a color of a reaction solution changes. The immunoassay is an analysis method in which a reagent obtained by adding a labeled component to a substance that is directly or indirectly and specifically bound to an analysis target component contained in a sample is used to count the labeled component.

In prescribed analysis, for example, in immunoassay, an automatic analyzer according to an exemplary conventional technique performs control to dispose of a reaction container after using the reaction container storing a sample dispensed therein. The reaction container is disposed of after being used once. The automatic analyzer transfers the reaction container on a reaction container retaining mechanism to a disposal box or the like to dispose of the reaction container.

As an exemplary conventional technique relating to the aforementioned automatic analyzer, Patent Literature 1 describes a dispensing abnormality detection unit (for example, FIG. 3 or the like) or the like in an automatic analyzer. Patent Literature 2 describes a container liquid surface detection unit (for example, FIG. 5 or the like) or the like in an immune aggregation measurement device.

CITATION LIST

Patent Literature

Patent Literature 1: Japanese Patent Application Laid-Open No. 2015-175783
Patent Literature 2: Japanese Patent No. 2761385

SUMMARY OF INVENTION

Technical Problem

The automatic analyzer according to the exemplary conventional technique performs control to dispose of all reaction containers on the reaction container retaining mechanism before restarting device operation after the device operation is halted due to, for example, detection of a device abnormality. This is to ensure safety first and avoid using a used reaction container in subsequent analysis. A plurality of reaction containers at a plurality of positions on the reaction container retaining mechanism may include a used reaction container storing a reaction solution and an unused reaction container not storing a reaction solution. In the aforementioned control, an unused reaction container present on the reaction container retaining mechanism is disposed of and wasted, even through the reaction container may be able to be used. Therefore, there is room for improvement in the automatic analyzer in terms of the efficiency of using and disposing of containers. An object of the present invention is to provide a technique capable of efficiently controlling use and disposal of a container with regard to an automatic analyzer.

Solution to Problem

An automatic analyzer according to a representative embodiment of the present invention includes a controller configured to control analysis of a sample; a container retaining mechanism on which a plurality of containers is loadable at a plurality of positions; a dispensing mechanism configured to dispense the sample and a reagent to the container; a detection mechanism configured to detect a component from a reaction solution prepared by dispensing the sample and the reagent to the container; and a transfer mechanism configured to transfer the container when the container is to be loaded at a position on the container retaining mechanism and when the container at the position is to be disposed of to a disposal box. The dispensing mechanism includes a liquid surface detection mechanism configured to detect a liquid surface of a liquid in the container. The controller uses the dispensing mechanism at a prescribed timing to detect presence or absence of the liquid surface at a target position on the container retaining mechanism and the controller determines a state including presence or absence of the container accommodating the reaction solution. The controller performs control in which the controller performs operation of the disposal using the transfer mechanism at the position when the controller determines a state in which the container is present, and the controller does not perform operation of the disposal using the transfer mechanism at the position when the controller determines a state in which the container is not present.

Advantageous Effects of Invention

According to the present invention, it is possible to provide an automatic analyzer that efficiently controls disposal and use of a container.

BRIEF DESCRIPTION OF THE DRAWINGS

FIGS. 5A and 5B are diagrams showing the outline of control according to the first embodiment.
FIG. 6 is a diagram showing liquid surface detection according to the first embodiment.

FIGS. 8A and 8B are diagrams showing the outline of control of automatic analyzer according to a second embodiment of the present invention.

FIG. 9 is a diagram showing an exemplary process flow of container status determination according to the second embodiment.

FIG. 10 is a diagram showing abnormal lowering detection according to the second embodiment.

DESCRIPTION OF EMBODIMENTS

Figure 1:
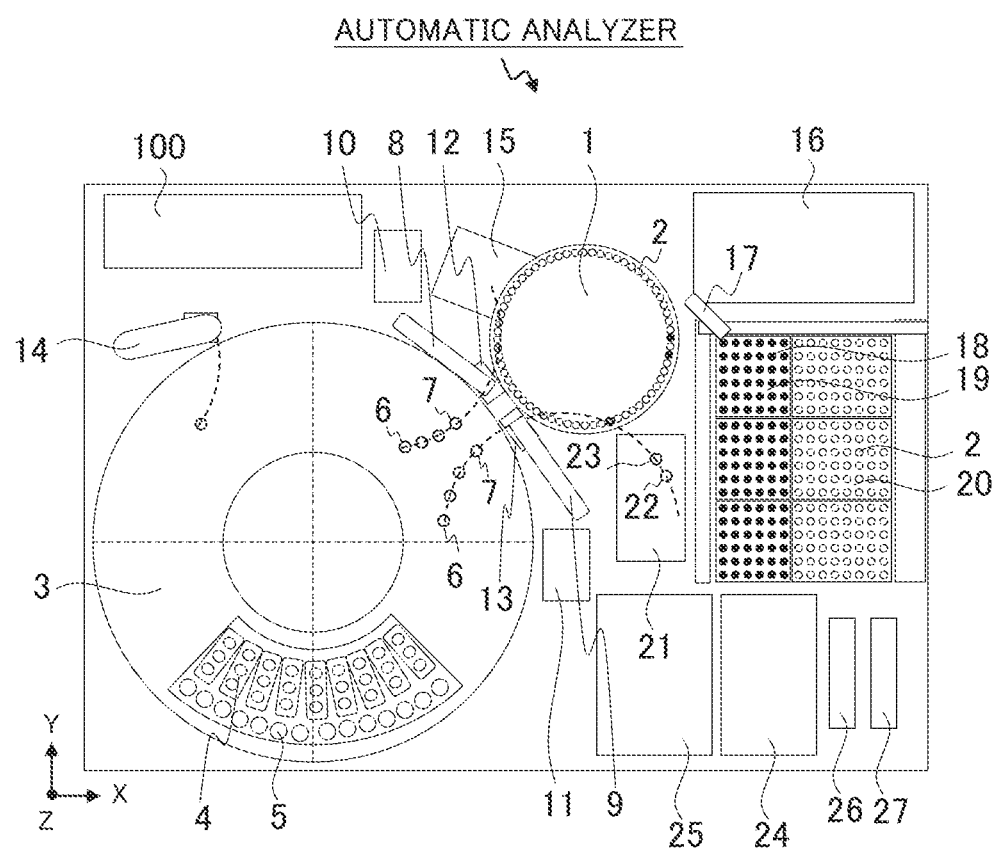
FIG. 1 is a diagram showing the configuration of an automatic analyzer.

Hereinafter, embodiments of the present invention are described in detail with reference to the drawings. In all the drawings, the same components are indicated by the same reference signs, and redundant description is omitted.

Problems and the Like

Supplementary explanation of the problems and the like is provided. In the automatic analyzer according to the exemplary conventional technique, as reaction containers for storing a reaction solution, there are two types, which are a disposable reaction container that is disposed of after being used and a reaction container that is reused multiple times after being cleaned. A container appropriate for analysis is used. When a disposable reaction container is used, the following loading, disposal, and the like are controlled. The automatic analyzer controls container disposal at prescribed times such as a time before analysis, a time during the analysis, and the time of the restart of the device operation. The time before the analysis is a time before an analysis preparation process (step S3 shown in FIG. 4 described later) including dispensing and the like is performed. The time during the analysis is a time in the middle of an analysis process (step S4 shown in FIG. 4 described later) including optical measurement and the like and a time after the analysis process. The time of the restart of the device operation is a time when the device operation is restarted after the device operation is halted due to detection of a device abnormality.

For example, to perform immunoassay, the automatic analyzer uses a transfer mechanism to grip a reaction container from a reaction container tray on which the disposable reaction container is stored, transfers the reaction container to a prescribed position on the incubator that is the reaction container retaining mechanism, loads the reaction container at the prescribed position. The automatic analyzer uses a dispensing mechanism to dispense a sample and a reagent to the reaction container at the prescribed position on the incubator to make a mixed liquid. The automatic analyzer holds the reaction container storing the mixed liquid on the incubator for a prescribed period of time to incubate or prepare the reaction solution. The automatic analyzer uses the transfer mechanism to move the target reaction container to a detection mechanism and performs optical measurement on the reaction solution within the reaction container. After that, the automatic analyzer uses the transfer mechanism to transfer the reaction container used for the analysis to the disposal box and dispose of the reaction container.

The automatic analyzer according to the exemplary conventional technique performs the disposal operation on all reaction containers at all positions on the incubator that is the reaction container retaining mechanism at the prescribed times such as the time before the analysis and the time of the restart of the operation. As described above, this is to ensure safety first and avoid using a used reaction container in the subsequent analysis. For example, after the automatic analyzer halts the device operation due to detection of a certain abnormality, the automatic analyzer restarts the device operation after trouble shooting or the like. At the time of the halt of the device operation, a used reaction container storing a reaction solution and an unused reaction container not storing a reaction solution may be present on the incubator. The automatic analyzer according to the exemplary conventional technique performs an operation of disposing of all reaction containers on the incubator at a prescribed time without making special determination, for example, determination for each position and determination of usage statuses of the reaction containers. In this case, even when an unused reaction container is present on the incubator, the reaction container is disposed of and wasted.

In addition, it is necessary to perform a disposal operation and a loading operation at each of multiple positions (refer to as loading positions in some cases) on the incubator. Therefore, there is a problem that it takes a long time to perform the aforementioned disposal operation, the aforementioned loading operation, and the like, depending on the number of loading positions on the incubator, the number of loadable reaction containers, the number of transfer mechanisms that transfer reaction containers, and the like and the start of analysis is delayed. For example, the disposal operation is an operation of causing each transfer mechanism to access one reaction container at one loading position, grip the reaction container, transfer the reaction container to the disposal box, and dispose of the reaction container. The loading operation is an operation of causing each transfer mechanism to access the reaction container tray, grip one reaction container, transfer the reaction container to one loading position on the incubator, and load the reaction container at the loading position on the incubator.

In addition, the automatic analyzer according to the exemplary conventional technique uses a dedicated sensor (in other words, a container presence/absence sensor) to detect whether a reaction container is present or absent. For example, at least one dedicated sensor is provided at a reaction container loading position on the incubator. This sensor uses, for example, light reflection or the like to detect whether a reaction container is present or absent at the loading position. It is possible to use this sensor to detect whether a reaction container is present or absent on the incubator. In addition, it is considered to use the detection result of this sensor to control the disposal operation and the like based on whether a reaction container is present or absent. However, this method requires the dedicated sensor and thus the cost is high. In particular, when a sensor is provided at each of the multiple positions on the incubator, the cost is higher.

Although this method can detect whether a reaction container is present or absent at a target position, a usage status such as whether a reaction solution is present or absent in the reaction container is neither detected nor determined. Thus, even when this method is used, all reaction containers on the incubator are disposed of, regardless of usage statuses of the reaction containers. An unused reaction container on the incubator is disposed of although the unused reaction container may be able to be used as it is for the subsequent analysis.

First Embodiment

An automatic analyzer according to a first embodiment is described with reference to FIGS. 1 to 7. The automatic analyzer according to the first embodiment has a function of checking and determining a status of a reaction container on an incubator that is a reaction container retaining mechanism at a prescribed time, and controlling a disposal operation or the like based on a result of the determination. The automatic analyzer according to the first embodiment does not use a dedicated sensor and uses a dispensing mechanism to determine a status of a reaction container at each position on the incubator. In particular, the automatic analyzer according to the first embodiment uses a liquid surface detection mechanism included in the dispensing mechanism to determine a status of a reaction container. A controller determines, as a status, at least a state in which a reaction container storing a reaction solution is not loaded or a state in which a reaction container storing a reaction solution is loaded. Then, the automatic analyzer according to the first embodiment determines and controls the disposal operation or the like for each position based on the status that is the result of the determination.

[Automatic Analyzer]

FIG. 1 shows a configuration of an upper surface of the automatic analyzer according to the first embodiment. The automatic analyzer according to the first embodiment includes a controller 100, an incubator 1, a shared disk 3, dispensing mechanisms 8 and 9, pumps 10 and 11, cleaning tanks 12 and 13, a reagent stirring mechanism 14, a spectrophotometer 15, a detection mechanism 16, a transfer mechanism 17, a dispensing tip array 19, a reaction container tray 20, a disposal box 21, a water tank 24, a waste liquid tank 25, a first liquid container 26, a cleaning liquid container 27, and the like. As directions for explanation, an X direction, a Y direction, and a Z direction are shown. The X direction and the Y direction are two directions forming a horizontal plane and orthogonal to each other. The X direction is a lateral direction of the device, while the Y direction is a depth direction of the device. The Z direction is a vertical direction and a height direction of the device. The controller 100 is a device including a control unit and a storage unit and is described later with reference to FIG. 2.

Figure 3:
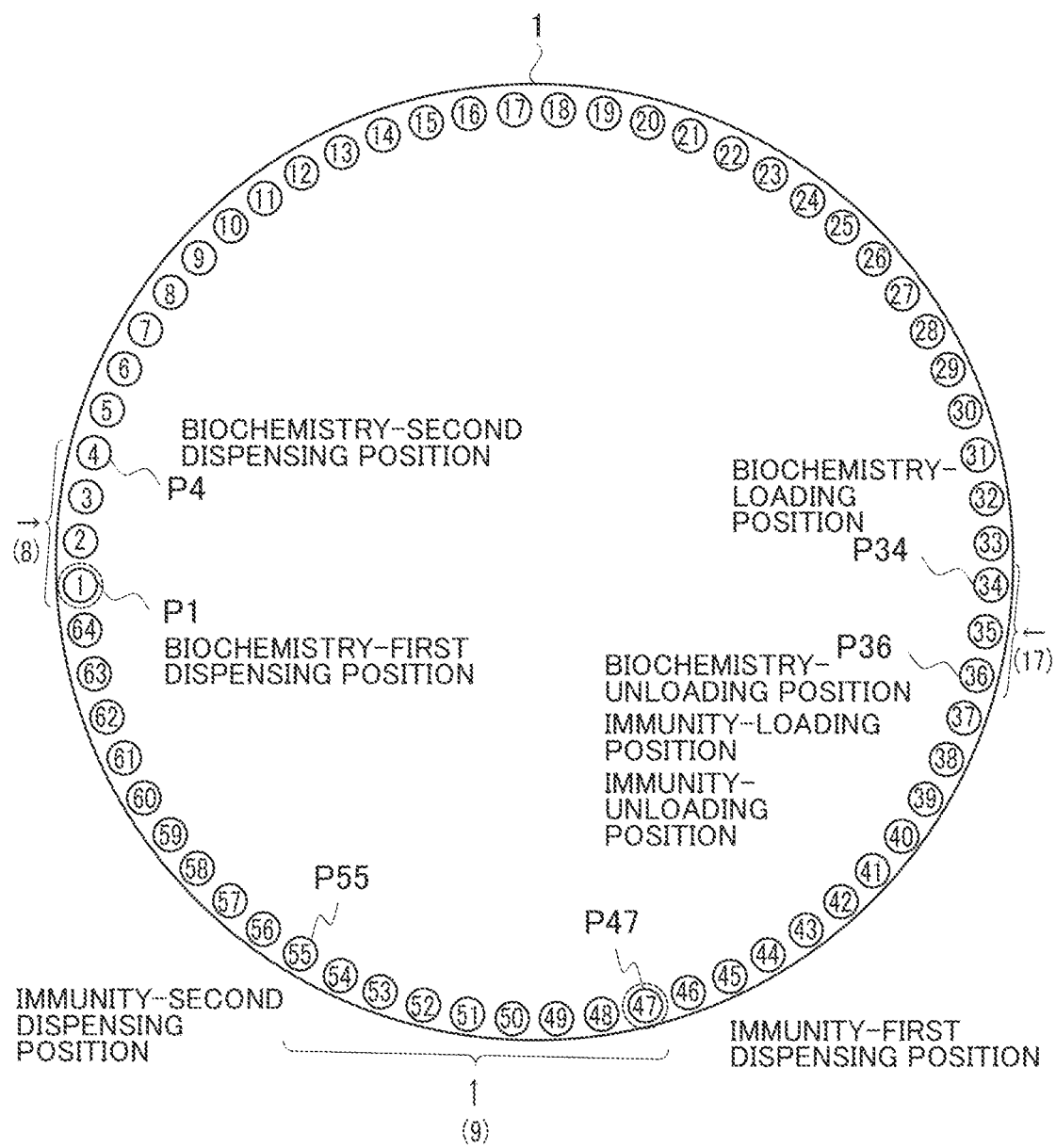
FIG. 3 is a diagram showing the reaction container loading position of an incubator according to the first embodiment.

The incubator 1 is a disk-shaped or columnar reaction container retaining mechanism and includes a rotation mechanism. As shown in FIG. 3 described later, a plurality of reaction containers 2 can be loaded and held at a plurality of positions on a circumference of the incubator 1. The incubator 1 includes a temperature management mechanism that maintains the held reaction containers 2 at a prescribed temperature for a prescribed period of time to promote chemical reaction of a reaction liquid. The reaction containers 2 are containers for storing a reaction solution based on a mixed liquid of a sample and a reagent. As the reaction containers 2, two types, the aforementioned reusable type and the aforementioned disposable type can be used. In the first embodiment, the reaction containers 2 to be used are disposable reaction containers as containers common to all analyses.

The incubator 1 is controlled by the controller 100 and a drive mechanism (FIG. 2 described later) so as to rotate by a prescribed distance in one cycle. The prescribed distance is a distance corresponding to a prescribed number of reaction containers 2. The incubator 1 is repeatedly rotated and stopped in a plurality of cycles. Therefore, the reaction containers 2 on the incubator 1 sequentially move and a prescribed process such as dispending is performed at each prescribed position.

The shared disk 3 is a disk-shaped container retaining mechanism on which a sample container 5 (for example, a specimen cup) and a reagent container 4 (for example, a reagent bottle) are loaded and held, such that the containers 4 and 5 share the shared disk 3. The shared disk 3 includes a rotation mechanism. The shared disk 3 is a mechanism obtained by combining a sample container retaining mechanism and a reagent container retaining mechanism into one common mechanism. The shared disk 3 includes a cooler and a cover. A plurality of sample containers 5 and a plurality of reagent containers 4 can be loaded and held at a plurality of positions on a circumference within the shared disk 3. In this example, the shared disk 3 has a structure in which the sample containers 5 are loaded on the outer circumferential side and the reagent containers 4 are loaded on the inner circumferential side, but is not limited thereto. The shared disk 3 may have a structure in which the reagent containers 4 are loaded on the outer circumferential side and the sample containers 5 are loaded on the inner circumferential side. The shared disk 3 may have a structure in which the shared disk 3 is not sectioned into the inner circumference and the outer circumference and each container can be loaded. The sample container retaining mechanism and the reagent container retaining mechanism may be independently provided in structures such as disks or racks.

Reagent aspiration positions 6 are prescribed positions on the circumference of the shared disk 3 and on trajectories accessible by nozzles of the dispensing mechanisms 8 and 9 at the time of dispensing. At the reagent aspiration positions 6, a reagent is aspirated from a reagent container 4. Sample aspiration positions 7 are prescribed positions on the circumference of the shared disk 3 and on the trajectories accessible by the nozzles of the dispensing mechanisms 8 and 9 at the time of dispensing. At the sample aspiration positions 7, a sample is aspirated from a sample container 5.

The dispensing mechanisms 8 and 9 and the cleaning tanks 12 and 13 are arranged between the incubator 1 and the shared disk 3. The dispensing mechanism 8 is a first dispensing mechanism. The dispensing mechanism 9 is a second dispensing mechanism. Each of the dispensing mechanisms 8 and 9 includes a rotational shaft, an arm, a nozzle, and the like. The arms and the nozzles of the dispensing mechanisms 8 and 9 are rotatable around the rotational shafts as indicated by dashed arcs. The nozzles are connected to the distal ends of the arms on the lower side in the vertical direction. The nozzles can move upward and downward in the vertical direction. The pump 10 is connected to the nozzle of the dispensing mechanism 8. The pump 11 is connected to the nozzle of the dispensing mechanism 9.

Although the two dispensing mechanisms 8 and 9 are provided in the first embodiment, the first embodiment is not limited thereto. The dispensing mechanisms 8 and 9 are arranged such that the nozzles do not physically interfere with each other on the trajectories and the mechanisms do not physically interfere with each other. The two dispensing mechanisms 8 and 9 are used for examinations in different analysis processes. The dispensing mechanism 8 is used for biochemical examination, and the dispensing mechanism 9 is used for immunological examination. The dispensing mechanism 8 dispenses a sample and a reagent for biochemical analysis. The dispensing mechanism 9 dispenses a sample and a reagent for immunoassay. Since it is highly required to prevent contamination between samples for the dispensing mechanism 9 for immunoassay, the dispensing mechanism 9 uses a disposable dispensing tip 18 to perform dispensing. The dispensing tip 18 is attached to the nozzle of the dispensing mechanism 9. The automatic analyzer according to the first embodiment uses disposable reaction containers 2 for both biochemical examination and immunological examination. In both biochemical examination and immunological examination, in the automatic analyzer according to the first embodiment, the corresponding dispensing mechanisms access and dispense a sample to be measured. In another embodiment, one dispensing mechanism or three or more dispensing mechanisms may be provided.

On the trajectory of the nozzle of the dispensing mechanism 8, the sample aspiration position 7 and the reagent aspiration position 6 on the shared disk 3, a first dispensing position and a second dispensing position (FIG. 3 described later) on the incubator 1, and the cleaning tank 12 are present. On the trajectory of the nozzle of the dispensing mechanism 9, the sample aspiration position 7 and the reagent aspiration position 6 on the shared disk 3, a first dispensing position and a second dispensing position (FIG. 3 described later) on the incubator 1, and the cleaning tank 13 are present. Since the dispensing mechanism 9 uses the dispensing tip 18, a dispensing tip attachment position 22 and a dispensing tip disposal position 23 are present on the trajectory of the nozzle of the dispensing mechanism 9.

For example, in sample dispensing, the nozzle of the dispensing mechanism 8 moves to the sample aspiration position 7 while rotating around its rotational axis along an arc, moves downward into a sample container 5 at the position, aspirates a sample from the inside of the sample container 5, and moves upward. Then, the nozzle of the dispensing mechanism 8 moves to the first dispensing position or the second dispensing position on the incubator 1, moves downward into a reaction container 2 at the position, and discharges the sample, and moves upward.

After the dispensing mechanisms 8 and 9 aspirate a sample or a reagent by the nozzles, the dispensing mechanisms 8 and 9 access the inside of a reaction container 2 and discharge the sample or the reagent. In addition, in this case, the dispensing mechanisms 8 and 9 repeat the aspiration operation and the dispensing operation by using the nozzles, thereby stirring the sample, the reagent, or a mixed liquid of the sample and the reagent in the reaction container 2 to promote mixing.

The pump 10 is a pump for the first dispensing mechanism and is used for the aspiration and discharge by the dispensing mechanism 8. The pump 11 is a pump for the second dispensing mechanism and is used for the aspiration and discharge by the dispensing mechanism 9. The cleaning tank 12 is a first dispensing nozzle cleaning tank and cleans the nozzle of the dispensing mechanism 8. The cleaning tank 13 is a second dispensing nozzle cleaning tank and cleans the nozzle of the dispensing mechanism 9. The reagent stirring mechanism 14 grips the reagent bottle 4 and stirs the reagent.

The spectrophotometer 15 is a photometer for biochemical examination and is arranged at a prescribed position around the incubator 1. The spectrophotometer 15 includes a light source and a detector. The spectrophotometer 15 performs optical measurement on a reaction solution in a reaction container 2 present at a prescribed position. The spectrophotometer 15 measures absorbance of the reaction solution by dispersing and detecting transmitted light obtained by irradiating the reaction solution in the reaction container 2 with light from the light source.

The detection mechanism 16 is a detection mechanism for immunological examination and performs optical measurement on a reaction solution in immunological examination. The automatic analyzer causes the transfer mechanism 17 to move, to the detection mechanism 16, a reaction container 2 storing a reaction solution that has reacted for a prescribed period of time on the incubator 1. The detection mechanism 16 performs optical measurement on the reaction solution stored in the reaction container 2. The immunological examination includes analysis using the principles of electrochemiluminescence and analysis using the principles of chemiluminescence as methods for detecting a labeled substance. A second liquid, a labeled substance, and the structure and physical characteristics of a detection region, which are suitable for each of the methods, are selected. The detection mechanism 16 uses a photomultiplier tube as a detector to measure the amount of emitted light derived from luminescent reaction of the labeled substance.

The transfer mechanism 17 is arranged between the mechanisms such as the incubator 1, the detection mechanism 16, the reaction container tray 20, and the disposal box 21. The transfer mechanism 17 is a mechanism that transfers the reaction container 2, the dispensing tip 18, and the like between the mechanisms. The transfer mechanism 17 has, at its distal end, a gripper that can grip the reaction container 2 and the dispensing tip 18. The transfer mechanism 17 can move in the X direction and the Y direction along a rail or the like and is rotatable around the rotational axis, and the distal end can move upward and downward in the Z direction. The transfer mechanism 17 can grip and release the reaction container 2 and the dispensing tip 18 by the operation of the distal end.

The reaction container tray 20 holds a plurality of unused reaction containers 2. The dispensing tip 18 is attached to the distal end of the nozzle of the dispensing mechanism 9 at the time of dispensing in immunoassay and is used as a disposable tip each time. A dispensing tip tray 19 holds a plurality of unused dispensing tips 18. The reaction container tray 20 and the dispensing tip tray 19 can be replenished with a reaction container 2 and the like by a user as appropriate.

The disposal box 21 is a disposal box for a reaction container 2 disposed of and a dispensing tip 18 disposed of. The disposal box 21 stores the reaction container 2 and the dispensing tip 18 transferred and disposed of by the transfer mechanism 17. The disposal box 21 can be extracted by the user via a drawer or the like. The dispensing tip attachment position 22 is a prescribed position at which the dispensing tip 18 is attached to the nozzle of the dispensing mechanism 9. The dispensing tip disposal position 23 is a prescribed position at which the dispensing tip 18 is disposed of from the nozzle of the dispensing mechanism 9. The disposal position of the reaction container 2 is a position vertically above the disposal box 21.

The water tank 24 is a tank for storing system water. The waste liquid tank 25 is a tank for storing a waste liquid. The first liquid container 26 is a container for storing a first liquid relating to analysis. The cleaning liquid container 27 is a container for storing a cleaning liquid.

Among the reaction containers 2 on the incubator 1, a reaction container 2 subjected to analysis (for example, absorbance measurement) is moved to the disposal box 21 and disposed of by the transfer mechanism 17. In this case, the transfer mechanism 17 accesses a target position on the incubator 1, grips the reaction container 2 at the position, and transfers the reaction container 2 to the position above the disposal box 21, and releases the reaction container 2. Therefore, the reaction container 2 falls into the disposal box 21 and is stored in the disposal box 21. In addition, a reaction container 2 subjected to the optical measurement by the detection mechanism 16 is transferred to the disposal box 21 and disposed of by the transfer mechanism 17 in the same manner.

Although the automatic analyzer according to the first embodiment enables the stirring function using the dispensing mechanisms 8 and 9, the automatic analyzer according to the first embodiment may include an independent stirring mechanism. In addition, the transfer mechanism 17 can perform a plurality of types of operations including the operation of loading a reaction container 2, the operation of disposing of a reaction container 2, and the like, but is not limited thereto. The various operations may be performed by another mechanism.

[Functional Block Configuration]

Figure 2:
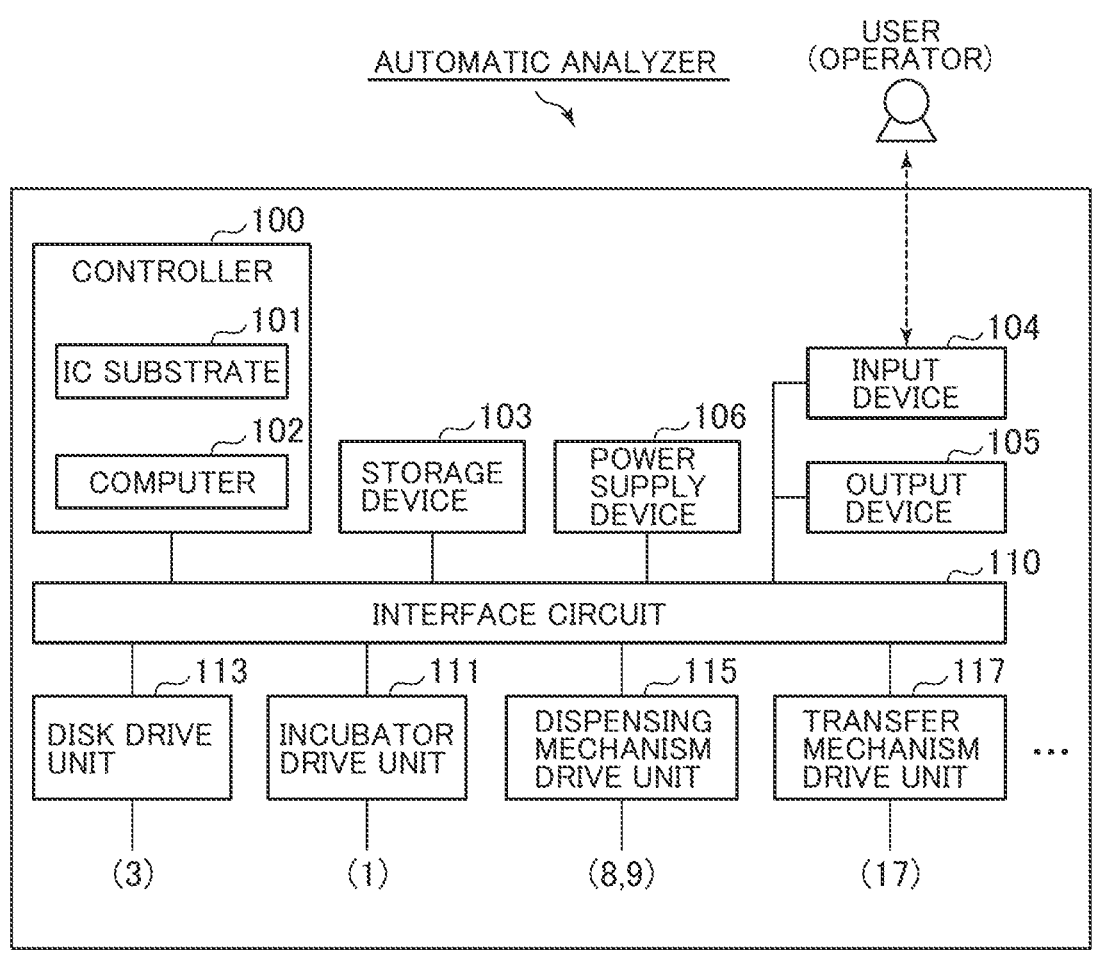
FIG. 2 is a diagram showing the functional block configuration of an automatic analyzer according to a first embodiment.

FIG. 2 shows a functional block configuration relating to the controller 100 in the automatic analyzer according to the first embodiment. The automatic analyzer according to the first embodiment includes the controller 100, a storage device 103, an input device 104, an output device 105, a power supply device 106, an interface circuit 110, a shared disk drive unit 113, an incubator drive unit, 111, a dispensing mechanism drive unit 115, a transfer mechanism drive unit 117, and the like. The various mechanisms are connected to the controller 100 via the interface circuit 110 including a bus, a cable, and the like. The controller 100 includes at least one of an IC substrate 101 and a computer 102. The controller 100 includes a processor and a memory and controls the overall automatic analyzer. The controller 100 controls the drive units to control the rotation of the incubator 1, the rotation of the shared disk 3, the dispensing operations of the dispensing mechanisms 8 and 9, the transfer operation of the transfer mechanism 17, and the like. The storage device 103 stores control data, information, and the like. The input device 104 includes an operation panel and the like. The output device 105 includes a display device, a printing device, a light emitting device such as an LED, and an audio output device such as a speaker. The power supply device 106 supplies power to each of the units.

The disk drive unit 113 is a mechanism including a motor and the like and drives the rotation of the shared disk 3 and the like in accordance with an instruction from the controller 100. The incubator drive unit 111 is a mechanism including a motor and the like and drives the rotation of the incubator 1 and the like in accordance with an instruction from the controller 100. The dispensing mechanism drive unit 115 is a mechanism including a motor and the like and drives the nozzles, the pumps 10 and 11, and the like in accordance with an instruction from the controller 100 to drive the operations of the dispensing mechanisms 8 and 9. The transfer mechanism drive unit 117 is a mechanism including a motor and the like and drives the operation of the transfer mechanism 17 in accordance with an instruction from the controller 100.

The controller 100 is also connected to the spectrophotometer 15 and the detection mechanism 16 and receives signals from the spectrophotometer 15 and the detection mechanism 16 to perform an analysis process. The controller 100 receives an input operation of the user via the input device 104. The controller 100 outputs a result of the analysis process to the user from the output device 105. When the controller 100 detects an abnormality of the device, the controller 100 halts the operation of the device and provides a guide such as a graphical user interface (GUI) or the like for trouble shooting to the user via the output device 105.

[Container, Biochemical Analysis, and Immunoassay]

A container to be controlled particularly in the first embodiment is a reaction container 2. The reaction container 2 may be in various states, for example, the following states, a state (1) of not storing anything, a state (2) of storing only a specimen, a state (3) of storing only a reagent, a state (4) of storing either a mixed liquid of a specimen and a reagent or a reaction solution, a state (5) of storing a cleaning liquid, and a state (6) of storing blank water. A state of an "unused reaction container" in the first embodiment corresponds to the aforementioned state (1). A state of a "used reaction container" corresponds to any of the states of the aforementioned states (2) to (6).

In immunoassay, a used reaction container is disposed of as a disposable container. In biochemical analysis, a used reaction container can be cleaned and reused, but is disposed of as a disposable container based on the immunoassay in the first embodiment. The automatic analyzer according to the first embodiment includes the mechanisms that enable biochemical analysis and immunoassay in the one device. Specifically, this automatic analyzer includes the two dispensing mechanisms 8 and 9 as a dispensing mechanism and uses the dispensing mechanisms 8 and 9 for biochemical analysis and immunoassay. The automatic analyzer includes the mechanisms necessary for various types of analysis, and a unit that can be shared for the various types of analysis is implemented as a shared mechanism (for example, the shared disk 3). On the incubator 1, a reaction container 2 to be used for biochemical analysis and a reaction container 2 to be used for immunoassay can be present, and the two types of analysis can be performed in parallel. An automatic analyzer according to another embodiment may include only the immunoassay function.

[Dispensing Mechanisms, Liquid Surface Detection Mechanisms, and Abnormal Lowering Detection Mechanisms]

The dispensing mechanisms 8 and 9 each include a liquid surface detection mechanism and an abnormal lowering detection mechanism, which are described below. The liquid surface detection mechanism is a mechanism including a liquid surface detector that detects a liquid surface within a container to determine a suitable position at which the nozzle is stopped after being lowered in sample dispensing or reagent dispensing. The abnormal lowering detection mechanism is a mechanism including a detector that detects abnormal lowering (corresponding contact or the like) of the dispensing mechanism including the nozzle in dispensing. The automatic analyzer according to the exemplary conventional technique includes a detection mechanism including such a detector and the like for the purpose of improving the efficiency and accuracy of dispensing, preventing a container and a dispensing mechanism from being damaged, and the like.

[Incubator]

FIG. 3 shows a schematic configuration of an upper surface of the incubator 1 and shows loading positions of reaction containers 2. In this example, 64 positions indicated by numbers 1 to 64 are prescribed as a plurality of loading positions on the circumference of the upper surface of the incubator 1. Since the incubator 1 is rotatably driven, the positions (corresponding loading holes and reaction containers 2) on the circumference of the incubator 1 rotatably move. In the state shown in FIG. 3, the plurality of positions particularly includes positions P1, P4, P34, P36, and P47 as positions (prescribed positions in the automatic analyzer) accessible by the dispensing mechanisms 8 and 9 and the transfer mechanism 17.

The position P1 is a prescribed position (refer to as first dispensing position) at which a sample and a first reagent for biochemical examination are dispensed and stirred. The position P4 is a prescribed position (refer to as second dispensing position) at which a sample and a second reaction for biochemical examination are dispensed and stirred. The position P34 is a prescribed position at which a reaction container 2 for biochemical examination is loaded. The position P36 is a prescribed position at which a reaction container 2 for biochemical examination is unloaded and a reaction container 2 for immunological examination is loaded and unloaded. The position P47 is a first dispensing position at which dispensing and stirring are performed for immunological examination. The position P55 is a second dispensing position at which dispensing and stirring are performed for immunological examination.

The configuration shown in FIG. 3 is an example. The number of positions on the incubator 1 and optimal values relating to the positions vary depending on various parameters such as a difference between reaction times in different reaction processes, the radii of the trajectories of the dispensing mechanisms 8 and 9, and the arrangement of the transfer mechanism 17.

The automatic analyzer can access a prescribed position on the incubator 1. For example, the nozzle of the dispensing mechanism 8 can access the position P1 and the position P4. The nozzle of the dispensing mechanism 9 can access the position P47 and the position P55. The transfer mechanism 17 can access the position P34 and the position P36. The automatic analyzer performs container status checking (step S1 or step S9 shown in FIG. 9) described later at a prescribed position on the incubator 1. For example, in the container status checking using the dispensing mechanism 8, at least one of the positions P1 and P4 may be used. In this example, in the container status checking, the dispensing mechanism 8 uses the position P1 and the dispensing mechanism 9 uses the position P47.

In the container status checking, the controller 100 rotatably drives the incubator 1 to sequentially perform the container status checking on all the positions on the incubator 1 by sequentially moving all the positions (corresponding loading holes and reaction containers 2) on the incubator 1 with respect to a prescribed position (for example, the position P1 and the position P47) for the container status checking.

The automatic analyzer according to the first embodiment performs the container status checking at all the positions (positions P1 to P64) on the incubator 1, while the certainty for the subsequent analysis is emphasized. The automatic analyzer according to the first embodiment is not limited thereto and may perform the container status checking at some of the positions on the incubator 1. For example, the controller 100 may perform the container status checking at some of the positions based on management information. In this case, it is possible to reduce a period of time required for the container status checking.

[Overall Process Flow]

Figure 4:
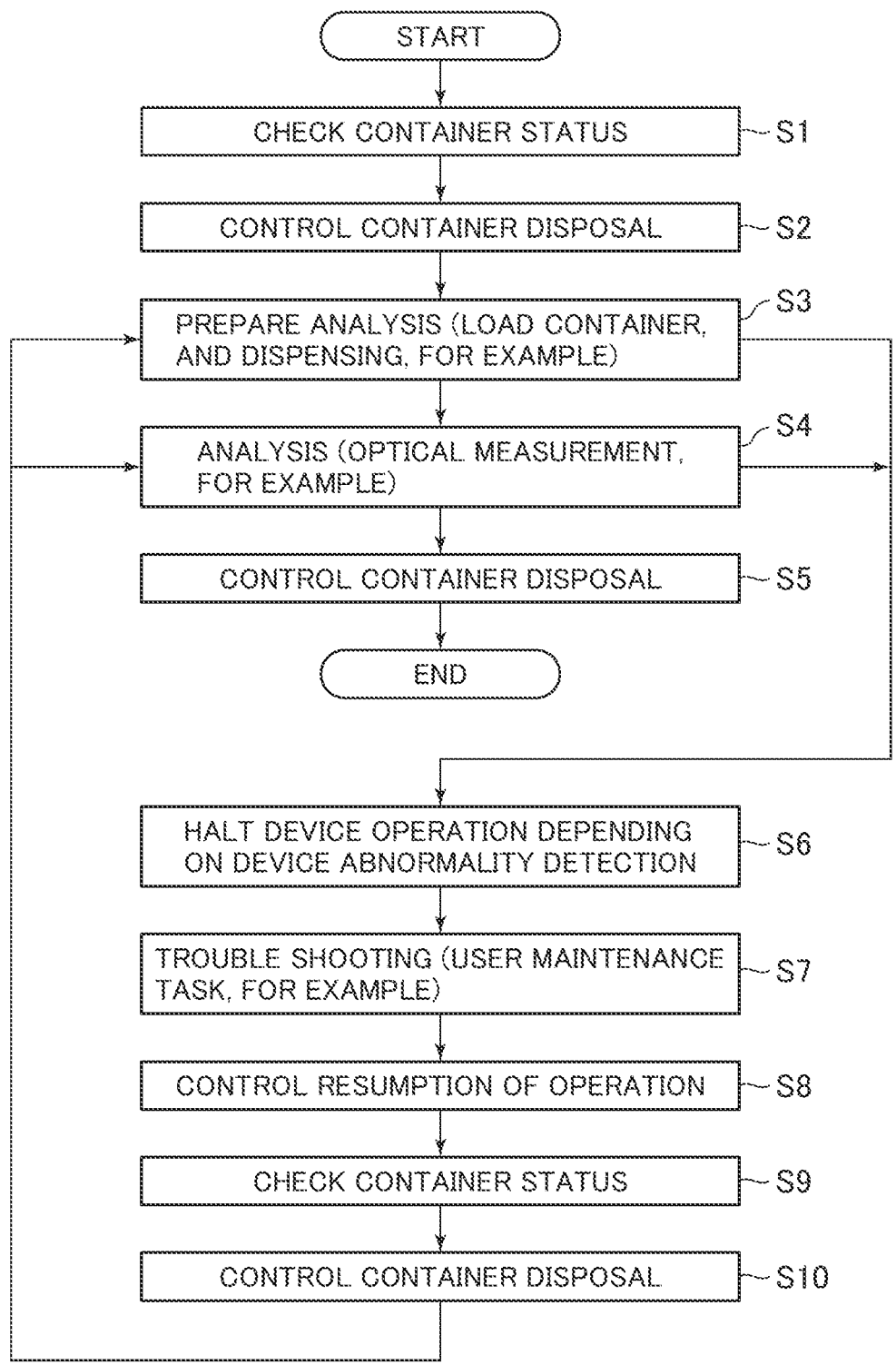
FIG. 4 is a diagram showing an example of an overall process flow according to the first embodiment.

FIG. 4 shows an example of a process flow relating to overall analysis by the automatic analyzer according to the first embodiment. FIG. 4 shows steps S1 to S10, which are described below in the order of the steps. In step S1, the controller 100 performs the container status checking after, for example, activating the device and detects a state of each position on the incubator 1. In step S2, the controller 100 performs container disposal control based on a result of the checking in step S1. In step S3, the controller 100 performs a prescribed analysis preparation process. The analysis preparation process includes a process of loading a reaction container 2 onto the incubator 1, a process of dispensing a sample and a reagent into the reaction container 2 to prepare a reaction solution, and the like. In step S4, the controller 100 uses the reaction solution in the reaction container 2 prepared for analysis to perform an analysis process such as specified biochemical analysis, specified immunoassay, or the like. The analysis process includes optical measurement of the reaction solution and a process of analyzing the reaction solution. The controller 100 stores a result of the analysis to the storage device 103 and outputs the result of the analysis to the user via the output device 105. In step S5, the controller 100 performs a disposal operation on the reaction container 2 used for the analysis and a dispensing tip 18 used for the analysis. Steps S3 to S5 are repeated for each reaction container 2 to be analyzed. When the analysis is completed on all reaction containers 2, the flow ends.

When a certain abnormality occurs in the automatic analyzer in the middle of step S3 or S4, the controller 100 causes the process flow to proceed to step S6 and temporarily halt the device operation based on the detection of the device abnormality. In step S7, the controller 100 performs trouble shooting or the like to handle the abnormality. The controller 100 provides a GUI screen for guiding a trouble shooting task or a maintenance task or the like to the user. The user performs the maintenance task or the like via the GUI screen or the like to handle the abnormality. In step S8, the controller 100 confirms that the automatic analyzer changes to a normal state, and performs control to resume the device operation. In step S9, the controller 100 performs the container status checking in the same manner as step S1 in response to the resumption of the operation. In step S10, the controller 100 performs the disposal control on the reaction container 2 based on a result of the checking in step S9. After that, the controller 100 causes the process flow to step S3 or S4 and returns to the state before the halt.

[Control Overview (1)]

FIG. 5 shows tables summarizing a control overview according to the first embodiment. A table (A) shows an overview of container status determination, and a table (B) shows an overview of the disposal control or the like corresponding to (A). In the table (A), one of two rows indicates that a liquid surface is detected by using the liquid surface detection mechanisms of the dispensing mechanisms 8 and 9, and the other of the two rows indicates that a liquid surface is not detected by using the liquid surface detection mechanisms of the dispensing mechanisms 8 and 9. Information indicating that a liquid surface is not detected corresponds to a state in which a liquid such as a reaction solution is not present. Information indicating that a liquid surface is detected corresponds to a state in which a liquid such as a reaction solution is present. An item in each row indicates a value of a state determination result based on a result of detecting a liquid surface. The values are two types of state values, which indicate that (1) a "reaction container is not present" and (3) a "used reaction container is present". The controller 100 uses the liquid surface detection mechanisms of the dispensing mechanisms 8 and 9 to detect whether a liquid surface is present or absent at the time of the lowering of the nozzles, and determines, as a status of a reaction container 2 at a target position, a state (1) in which a "reaction container is not present" or a state (3) in which a "used reaction container is present". When a liquid surface is not detected, the controller 100 determines the state (1) in which a "reaction container is not present". When a liquid surface is detected, the controller 100 determines the state (3) in which a "used reaction container is present". The state (1) in which a "reaction container is not present" is a state in which a reaction container 2 is not loaded at a target position. The state (3) in which a "used reaction container is present" is a state in which a reaction container 2 storing a reaction solution is loaded.

In the table (B), an item in each row indicates details of control of the disposal operation and the transfer operation corresponding to determination result values indicated in (A). In the state (1) in which a "reaction container is not present", the controller 100 determines that the disposal operation is not required at the target position (corresponding position determined to be a position at which a "reaction position is not present") with regard to the disposal control. The disposal operation is an operation of causing the transfer mechanism 17 to access the target position on the incubator 1, grip the reaction container 2, transfer the reaction container 2 to the disposal box 21, and dispose of the reaction container 2. In addition, with regard to transfer control, the controller 100 controls the transfer mechanism 17 to acquire an unused reaction container 2 from the reaction container tray 20 and transfer and load the reaction container 2 to the target position on the incubator 1 at the time of the subsequent analysis. The time of the subsequent analysis corresponds to steps S3 and S4 subsequent to steps S1 and S2 or steps S9 and S10 in FIG. 4.

In the state (3) in which a "used reaction container is present", the controller 100 determines that the disposal operation is required at the target position (corresponding position determined to be a position at which a "used reaction container is present") with regard to the disposal control. The controller 100 moves the target position on the incubator 1 to a position (position P34 or position P36 in FIG. 3) accessible by the transfer mechanism 17. Then, the controller 100 controls the transfer mechanism 17 to transfer the used reaction container 2 at the target position to the disposal box 21 and dispose of the reaction container 2. In addition, the controller 100 controls the transfer mechanism 17 to acquire an unused reaction container 2 from the reaction container tray 20 and load the reaction container 2 to the target position on the incubator 1.

[Liquid Surface Detection Mechanisms]

The liquid surface detection mechanisms included in the dispensing mechanisms 8 and 9 are described with reference to FIG. 6. The automatic analyzer according to the exemplary conventional technique includes a liquid surface detection mechanism in the dispensing mechanism. FIG. 6 is an explanatory diagram relating to liquid surface detection. The automatic analyzer according to the first embodiment uses the liquid surface detection mechanisms of the dispensing mechanisms 8 and 9 to determine and detect a status of a reaction container 2.

A main function and purpose of the liquid surface detection mechanism according to the exemplary conventional technique are to detect a liquid surface in a container to control dispensing (that is, aspiration and discharge of a liquid) at an appropriate position. For example, conventionally, the amount of a sample stored in an individual sample container may vary depending on the individual sample container at the time of a dispensing operation of aspirating the sample from the sample container. At the time of the dispensing operation, it is preferable to aspirate the sample such that a distal end of a nozzle matches a position on a liquid surface in the sample container. The automatic analyzer controls the dispensing mechanism to cause the distal end of the nozzle to follow a position on the liquid surface based on a change in the amount of a liquid to be aspirated and a change in the position on the liquid surface. Therefore, the automatic analyzer according to the exemplary conventional technique uses the liquid surface detection mechanism to detect a state in which the distal end of the nozzle is present at a position on the liquid surface when lowering the nozzle to, for example, the inside of the sample container. The same applies to dispensing of a reagent. The liquid surface can be detected by using, for example, an electric circuit to detect and determine a change in electrostatic capacitance.

In the automatic analyzer according to the first embodiment, the liquid surface detection function is a function of causing liquid surface detection circuits provided in the dispensing mechanisms 8 and 9 to detect, based on a change in electrostatic capacitance, whether distal ends of the nozzles have contacted a liquid surface in a reaction container 2. When the change in the electrostatic capacitance is equal to or larger than a threshold, the liquid surface detection function determines that a liquid surface is present. When the change in the electrostatic capacitance is smaller than the threshold, the liquid surface detection function determines that a liquid surface is not present.

(A) of FIG. 6 schematically shows, for example, the nozzle 51 of the dispensing mechanism 8, a single loading position 50 on the incubator 1, a reaction container 2 loaded at the loading position 50, and the like. The loading position 50 corresponds to, for example, a loading hole. The shape of the reaction container 2, a method of loading the reaction container 2, and the like are examples and are not limited. The controller 100 moves, for example, the nozzle of the dispensing mechanism 8 to the loading position 50 that is a target position in the container status checking. First, the dispensing mechanism 8 moves the nozzle 51 to a position above the loading position 50. At this time, the position of the distal end of the nozzle 51*a* is, for example, a position Z1 in the vertical direction. The dispensing mechanism 8 lowers the nozzle 51*a*. The nozzle 51*a* passes through a position Z2 on an upper surface of the reaction container 2 and is lowered. This reaction container 2 is a used reaction container 2 storing a reaction solution 52. The liquid surface of the reaction solution 52 is at a position Z3, for example. During the lowering, the distal end of the nozzle 51*b* contacts the liquid surface of the reaction solution 52. The liquid surface detection circuit detects a change in the electrostatic capacitance at this time, thereby determining that the liquid surface is present.

[Process Flow (1)]

Figure 7:
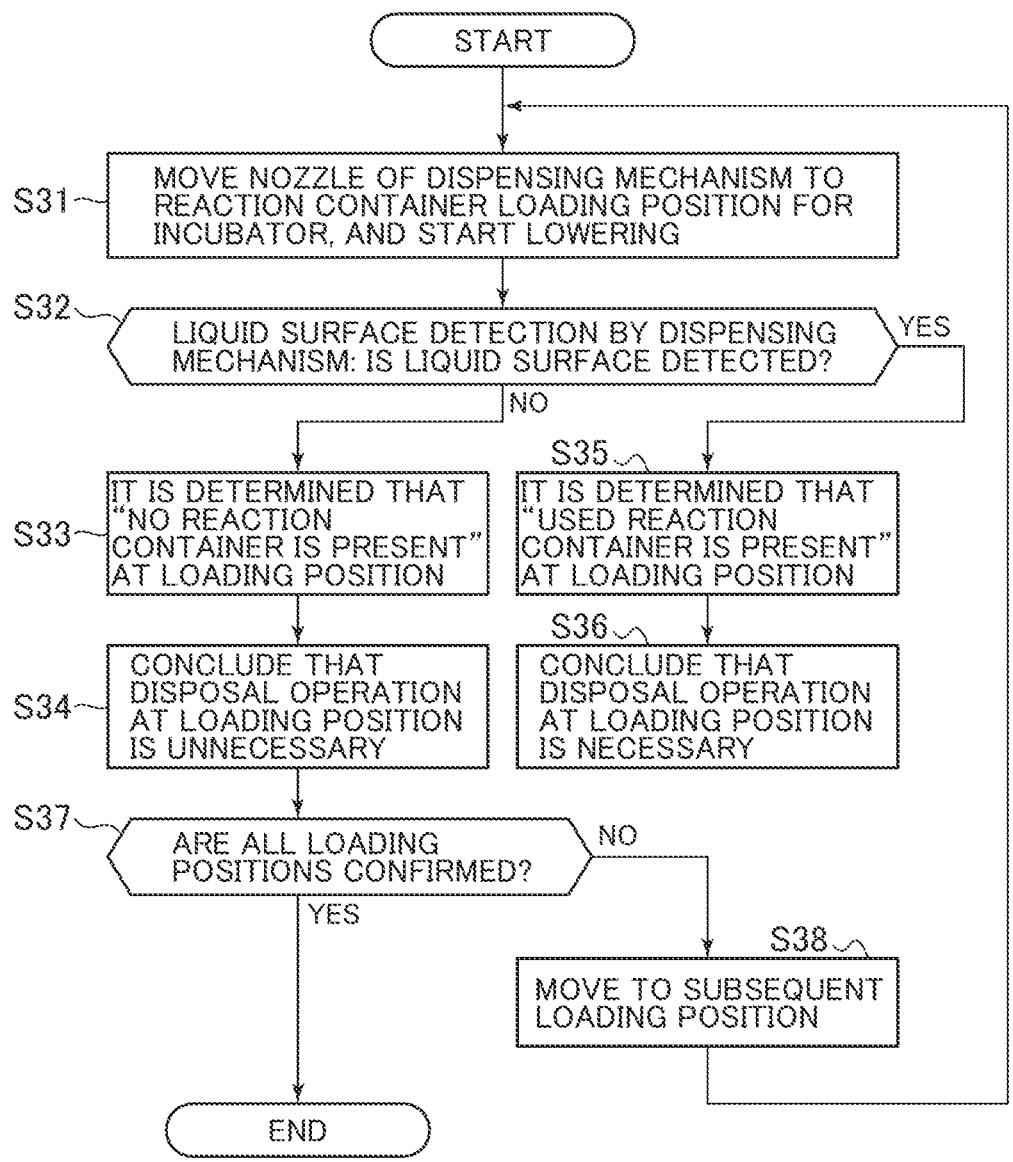
FIG. 7 is a diagram showing an exemplary process flow of container status determination according to the first embodiment.

FIG. 7 shows a process flow relating to the container status checking (step S1 or S9 of FIG. 4) and the disposal control (step S2 or S10) in the automatic analyzer according to the first embodiment. FIG. 7 shows steps S31 to S38, which are described below in the order of the steps. A function according to the first embodiment uses the liquid surface detection mechanisms included in the dispensing mechanisms 8 and 9 to recognize presence or absence of a reaction container 2 at each target position and a usage status (presence or absence of a used reaction container) of the reaction container 2, and determines a detail (whether the disposal operation is required or the like) of the disposal control of the reaction container 2 or the like based on the recognition.

In step S31, the controller 100 moves, for example, the nozzle of the dispensing mechanism 8 to a position above a reaction container 2 loading position (for example, the position P1 shown in FIG. 3) on the incubator 1 and causes the dispensing mechanism 8 to start lowering the nozzle by a prescribed amount at the loading position. The prescribed amount is a set value.

In step S32, the controller 100 causes the liquid surface detection mechanism of the dispensing mechanism 8 to detect whether the nozzle has detected a liquid surface at the loading position during the lowering. The process flow is branched based on the result of the detection in step S32. When the nozzle of the dispensing mechanism 8 is lowered by the prescribed amount at the loading position without detecting the liquid surface during the lowering, that is, when the liquid surface is not detected (N), the process flow proceeds to step S33. When the nozzle of the dispensing mechanism 8 detects the liquid surface at the reaction container loading position during the lowering, that is, when the liquid surface is detected (Y), the process flow proceeds to step S35.

In step S33, the controller 100 determines a state in which a reaction container 2 is not loaded at the loading position, that is, the state (1) in which a "reaction container is not present", and the process flows proceeds to step S34. In step S34, the controller 100 determines that the disposal operation of disposing of the reaction container 2 at the loading position by the transfer mechanism 17 is not required.

On the other hand, in step S35, the controller 100 determines a state in which a reaction container 2 storing a reaction solution is loaded at the loading position, that is, the state (3) in which an "unused reaction container is present", the process flow proceeds to step S36. In step S36, the controller 100 determines that the disposal operation of disposing of the reaction container 2 at the loading position by the transfer mechanism 17 is required.

After step S34 and step S36, the process flow proceeds to step S37. In step S37, the controller 100 confirms whether statuses of reaction containers 2 at all the loading positions on the incubator 1 have been completely confirmed by using the liquid surface detection mechanism of the aforementioned dispensing mechanism 8. When the confirmation of all the loading positions is completed (Y), the flow ends. When the confirmation of all the loading positions is not completed (N), the process flow proceeds to step S38. In step S38, the controller 100 rotatably drives the incubator 1 to move an unconfirmed loading position to the position (position P1) at which the nozzle of the dispensing mechanism 8 is lowered. After that, the process flow returns to step S31.

Although the aforementioned example describes the case in which the container status checking is performed using the dispensing mechanism 8, the container status checking is not limited thereto. Even when the dispensing mechanism 9 is used or even when the dispensing mechanisms 8 and 9 are simultaneously used, the same function can be implemented. In addition, even when the automatic analyzer includes a liquid surface detection mechanism as well as the dispensing mechanisms 8 and 9, the same function can be implemented using the liquid surface detection mechanism.

[Effects and the Like of First Embodiment]

As described above, the automatic analyzer according to the first embodiment can efficiently use and dispose of the reaction containers 2. The automatic analyzer according to the first embodiment can use the liquid surface detection mechanisms included in the dispensing mechanisms 8 and 9 to determine statuses of the reaction containers 2 at the loading positions on the incubator 1 as the container status checking and perform the disposal operation of disposing of the reaction containers 2 at the loading positions on the incubator 1 in different manners. The disposal operation may not be performed by the transfer mechanism 17 at a position determined to be in the state in which a "reaction container is not present". Therefore, it is possible to improve the overall efficiency of the disposal operation and reduce a period of time required until the subsequent analysis is performed. In addition, regarding the functions and the methods of the container status checking and the disposal control according to the first embodiment, a dedicated liquid surface detection sensor is not required to be provided on the incubator 1 or the like, and an existing mechanism can be used to implement the functions with low cost.

Second Embodiment

An automatic analyzer according to a second embodiment is described with reference to FIGS. 8 to 10. A basic configuration according to the second embodiment is the same as or similar to that according to the first embodiment, and constituent components according to the second embodiment that are different from the first embodiment are described below.

Even when a used reaction container and an unused reaction container are present on an incubator, the automatic analyzer according to the second embodiment has a function of detecting statuses of the reaction containers while distinguishing between the used reaction container and the unused rection container and of performing control to perform a disposal operation and the like at positions in different manners. The automatic analyzer according to the second embodiment uses liquid surface detection mechanisms and abnormal lowering detection mechanisms included in dispensing mechanisms to determine a status including a usage status of a reaction container at each position on the reaction container retaining mechanism (corresponding incubator). A controller determines, as statuses, at least a state in which a used reaction container storing a reaction solution is loaded and a state in which an unused reaction container not storing a reaction solution is loaded. Then, the automatic analyzer according to the second embodiment determines and controls the disposal operation and the like for each position based on the statuses that are the results of the determination.

The automatic analyzer according to the second embodiment uses the liquid surface detection mechanisms included in the dispensing mechanisms 8 and 9 to detect the status of a reaction container 2 at each loading position and uses the abnormal lowering detection mechanisms included in the dispensing mechanisms 8 and 9 to detect the status of the reaction container 2 at each loading position. The automatic analyzer according to the second embodiment 2 combines results of the detection by the liquid surface detection mechanisms with results of the detection by the abnormal lowering detection mechanisms to determine the usage status of the reaction container 2 at each loading position.

[Control Overview (2)]

FIG. 8 shows tables indicating a control overview according to the second embodiment. The table (A) shows an overview of container status checking, and the table (B) shows an overview of disposal control corresponding to (A) and the like. In the table (A), one of two rows indicates that a liquid surface is detected by using the liquid surface detection mechanisms, the other of the two rows indicates that a liquid surface is detected by using the liquid surface detection mechanisms, one of two columns indicates that abnormal lowering is detected by using the abnormal lowering detection mechanisms, and the other of the two columns indicates that abnormal lowering is not detected by using the abnormal lowering detection mechanisms. Information indicating that a liquid surface is not detected corresponds to a state in which a liquid such as a reaction solution is not present. Information indicating that a liquid surface is detected corresponds to a state in which a liquid such as a reaction solution is present. Information indicating that abnormal lowering is not detected corresponds to a state in which there is no contact and a reaction container is not present. Information indicating that abnormal lowering is detected corresponds to a state in which there is contact and a reaction container is present. Items in which the rows and the columns intersect indicate values of status determination results corresponding to combinations of the results of the two types of detection. The values are values of three types of states, a state (1) in which a "reaction container is not present", a state (2) in which an "unused reaction container is present", and a state (3) in which a "used reaction container is present". The states (1) and (3) are the same as the states described in the first embodiment (FIG. 5). In the second embodiment, the state (2) is added.

When a liquid surface is not detected and abnormal lowering is not detected, the controller 100 determines the state (1) in which a "reaction container is not present". When a liquid surface is not detected and abnormal lowering is detected, the controller 100 determines the state (2) in which an "unused reaction container is present". When a liquid surface is detected, the controller 100 determines the state (3) in which a "used reaction container is present" regardless of whether abnormal lowering is detected.

The determination that a liquid surface is not detected corresponds to the prediction that a reaction container 2 is not loaded or that a reaction container 2 is loaded but a liquid such as a reaction solution is not present in the reaction container 2, since there is no liquid surface. The determination that abnormal lowering is not detected corresponds to the prediction that an object that blocks the operation of lowering the nozzle is not present, that is, the prediction that a bottom surface of a reaction container 2 is not present or an object or the like is not present on the bottom surface, since the nozzle was lowered by a prescribed amount. Therefore, the controller 100 determines the state (1) in which a "reaction container is not present" based on the aforementioned two determination results. In addition, the determination that a liquid surface is not detected and the determination that abnormal lowering is detected indicate that the distal end of the nozzle contacts a bottom surface of a reaction container 2 not storing a reaction solution or an object on the bottom surface, since the nozzle was not lowered by the prescribed amount. Therefore, the controller 100 determines the state (2) in which an "unused reaction container is present" based on the aforementioned two determination results. In addition, the determination that a liquid surface is detected corresponds to the prediction that a reaction container 2 storing a reaction solution is loaded at a loading position. When a liquid surface is detected, the detection and determination of abnormal lowering is not required. Therefore, in this case, the controller 100 determines the state (3) in which a "used reaction container is present".

In the table (B), rows and columns are the same as those of (A), items in which the rows and the columns intersect indicate details of disposal control and the like based on determination result values of (A). In the state (1) in which a "reaction container is not present", the disposal operation is not performed at a target position (corresponding position determined to be a position at which a "reaction container is not present"). In addition, the controller 100 controls the transfer mechanism 17 to acquire an unused reaction container 2 from the reaction container tray 20, transfer the reaction container 2 to the target position on the incubator 1, and loads the reaction container 2 onto the target position at the time of the subsequent analysis.

In the state (2) in which an "unused reaction container is present", the controller 100 does not perform the disposal operation at a target position (corresponding position determined to be a position at which an "unused reaction container is present") with regard to the disposal control. In addition, the controller 100 performs control to use the unused reaction container 2 loaded at the target position on the incubator 1 at the time of the subsequent analysis. The controller 100 controls the transfer mechanism 17 such that the transfer mechanism 17 does not transfer and load a new reaction container 2 to the target position from the reaction container tray 20.

In the state (3) in which a "used reaction container is present", the controller 100 moves a target position (corresponding position determined to be a position at which a "used reaction container is present") on the incubator 1 to a position accessible by the transfer mechanism 17 with regard to the disposal control. Then, the controller 100 controls the transfer mechanism 17 to transfer the used reaction container 2 at the target position to the disposal box 21 and dispose of the reaction container 2. In addition, the controller 100 controls the transfer mechanism 17 to acquire an unused reaction container 2 from the reaction container tray 20 and transfer and load the reaction container 2 to the target position on the incubator 1 at the time of the subsequent analysis.

[Abnormal Lowering Detection Mechanisms]

The abnormal lowering detection mechanisms included in the dispensing mechanisms 8 and 9 are described with reference to FIG. 10. The automatic analyzer according to the exemplary conventional technique includes an abnormal lowering detection mechanism in the dispensing mechanism. FIG. 10 shows an explanatory diagram relating to abnormal lowering detection by the abnormal lowering detection mechanisms. The automatic analyzer according to the second embodiment uses the liquid surface detection mechanisms and the abnormal lowering detection functions of the dispensing mechanisms 8 and 9 to determine and detect a usage status of a reaction container 2.

A main function and purpose of the abnormal lowering detection mechanism according to the exemplary conventional technique are to prevent damage, breakage, or the like caused by contact of the nozzle with a container at the time of a dispensing operation. Normally, in the dispensing operation, the automatic analyzer lowers the nozzle into a container, stops the nozzle at an appropriate position, aspirates or discharges a liquid at the position, and the like. In this case, the container may be shifted from an appropriate prescribed position in the vertical direction or the nozzle may be shifted from an appropriate prescribed position in the vertical direction. In those cases, the distal end of the nozzle may contact the bottom surface of the container or a certain object on the bottom surface. When the distal end contacts the bottom surface or the certain object, either one or both of the bottom surface and the certain object may be damaged, and when the damage is major, either one or both of the bottom surface and the certain object may be broken. Therefore, the automatic analyzer uses the abnormal lowering detection mechanism of the dispensing mechanism to detect the contact or the like as abnormal lowering and halts the dispensing operation (for example, the movement of the nozzle) based on the detection.

In the automatic analyzer according to the second embodiment, the abnormal lowering detection function is a function of detecting whether the distal end of the nozzle is not in contact with a bottom surface of a reaction container 2 by a detector provided at an upper portion of the dispensing mechanism 8 and determining whether abnormal lowering occurs based on whether the contact is detected. When the nozzle is lowered by a prescribed amount, the lowering corresponds to no contact and it is determined that abnormal lowering is not detected. When the nozzle is not lowered by the prescribed amount, the lowering corresponds to contact and is determined as abnormal lowering (abnormal lowering is detected). The detection of the abnormal lowering is the detection of abnormal lowering relating to an operation at the time of the lowering of the nozzle in a reaction container 2. This abnormal state is a state excluding a prescribed normal state and includes contact of the distal end of the nozzle with a bottom surface of a reaction container 2 or another object.

In FIG. 10, in the container status checking, the controller 100 moves, for example, the nozzle 51 of the dispensing mechanism 8 to a loading position 50 that is a target position in the same manner as described above. First, the dispensing mechanism 8 moves the nozzle 51a to a position above the loading position 50. The dispensing mechanism 8 lowers the nozzle 51a. This reaction container 2 is an unused reaction container 2 not storing a reaction solution 52. The controller 100 lowers the nozzle 51a by up to the prescribed amount as the maximum amount. The prescribed amount is a predetermined distance set for the container status checking and larger than a distance corresponding to a position in the vicinity of the bottom surface of the reaction container 2 in the normal state. The bottom surface of the reaction container 2 is at a position Z4. When the reaction container 2 and the nozzle are normally arranged, the distal end of the nozzle 51c contacts the bottom surface of the reaction container 2 during the lowering. The detector at the upper portion of the dispensing mechanism 8 detects the contact at this time, thereby determining that abnormal lowering is detected. The dispensing mechanism 8 halts the lowering of the nozzle in response to the detection of the contact. In the second embodiment, the abnormal lowering detection mechanisms are used for the container status checking, and thus the meaning of a value indicating that the abnormal lowering is detected is different from that of a state (abnormality of the dispensing operation) of abnormal lowering in the original function.

The controller 100 combines the result of detecting the abnormal lowering with a result of detecting a liquid surface, thereby determining the state (1) in which a "reaction container is not present", the state (2) in which an "unused reaction container is present", or the state (3) in which a "used reaction container is present". In each of the automatic analyzers according to the first embodiment and the second embodiment, the aforementioned mechanisms are used as the liquid surface detection and the abnormal lowering detection, but are not limited thereto. In another embodiment, another mechanism or another method may be used.

[Process Flow (2)]

FIG. 9 shows a process flow relating to the container status checking and the disposal control in the automatic analyzer according to the second embodiment. FIG. 9 shows steps S41 to S50, which are described below in the order of the steps. Steps S41, S42, and S47 to S50 are the same as or similar to steps S31 to S38 shown in FIG. 7, and steps S43 to S46 are mainly included as different steps. The controller 100 performs the aforementioned liquid surface detection in steps S41 and S42. When a liquid surface is not detected (N), the process flow proceeds to step S43.

In step S43, the controller 100 uses the abnormal lowering detection mechanism of the dispensing mechanism 8 to detect whether abnormal lowering (that is, contact) is detected during the lowering of the nozzle at a loading position. When abnormal lowering is not detected (N), the process flow proceeds to step S44. When abnormal lowering is detected (Y), the process flow proceeds to step S46. The transition to step S44 corresponds to the case in which a liquid surface is not detected and abnormal lowering is not detected as shown in FIG. 8. The transition to step S46 corresponds to the case in which a liquid surface is not detected and abnormal lowering is detected as shown in FIG. 8.

In step S44, the controller 100 determines the state (1) in which a "reaction container is not present" at the loading position. In step S45, the controller 100 determines that the disposal operation is not required at the loading position. On the other hand, in step S46, the controller 100 determines the state (2) in which an "unused reaction container is present" at the loading position. Then, the process flow proceeds to step S45 and the controller 100 determines that the disposal operation is not required at the loading position in the same manner.

[Effects and the Like of Second Embodiment]

As described above, the automatic analyzer according to the second embodiment can efficiently control the disposal and use of a reaction container 2. The automatic analyzer according to the second embodiment uses the liquid surface detection mechanisms and the abnormal lowering detection mechanisms of the dispensing mechanisms 8 and 9 to determine a usage status of each reaction container 2 at each loading position on the incubator 1. When the controller 100 determines that an unused reaction container 2 is present at a loading position, the controller 100 omits the disposal operation at the loading position and performs control to use the reaction container 2 as it is at the time of the subsequent analysis. The controller 100 performs control such that an operation of transferring a new reaction container to the loading position is not performed. Since the control is performed to perform an operation that varies depending on whether a reaction container 2 is present at a loading position and a usage status of the reaction container 2 at the loading position, it is possible to efficiently use the reaction container 2 and reduce the cost to operate the device and the like.

[Modification (1)]

The following automatic analyzer can be used as an automatic analyzer according to a modification. As a unit or a mechanism that detects the status of a reaction container 2, the automatic analyzer according to the modification uses another mechanism, for example, the transfer mechanism 17 instead of the abnormal lowering detection mechanisms included in the aforementioned dispensing mechanisms 8 and 9. The transfer mechanism 17 includes the gripper that can grip a reaction container 2. The controller 100 controls the transfer mechanism 17 to access a loading position on the incubator 1 and perform an operation of gripping a reaction container 2 by the gripper in the aforementioned container status checking. In this case, when the gripper of the transfer mechanism 17 can grip the reaction container 2, the controller 100 can determine that the reaction container 2 is present at the loading position. When the gripper of the transfer mechanism 17 cannot grip the reaction container 2, the controller 100 can determine that the reaction container 2 is not present at the loading position. The controller 100 can combine this determination with the aforementioned determination of the liquid surface detection, thereby determining the usage status of the reaction container 2 at the loading position in the same manner as described above.

In the modification, the liquid surface detection mechanisms of the dispensing mechanisms 8 and 9 and the transfer mechanism 17 are used to perform the two types of detection. In the second embodiment, since the liquid surface detection mechanisms and the abnormal lowering detection mechanisms of the dispensing mechanisms 8 and 9 are used to perform the two types of detection, the statuses of the reaction containers 2 can be determined only by controlling the dispensing mechanisms 8 and 9.

[Modification (2)]

Like the aforementioned automatic analyzer according to the exemplary conventional technique, a dedicated sensor (container presence/absence sensor) may be provided at a reaction container loading position and a detection result of the sensor may be used. Instead of the abnormal lowering detection mechanisms of the dispensing mechanisms 8 and 9, this sensor may be used. In this modification, as described above, the cost of the sensor is required but the same functions and effects as the second embodiment can be obtained by a combination of the sensor and the liquid surface detection.

Although the embodiments of the present invention are described above in detail, the present invention is not limited to the aforementioned embodiments and can be variously modified without departing from the gist. The aforementioned embodiments describe the examples of the complex automatic analyzer having the plurality of measurement types of measurement units and the multi-module automatic analyzer, but the implementation of the devices is not limited. An automatic analyzer that can perform a single type of measurement can be used. Addition, removal, replacement, and the like can be made for each of the constituent components described in the embodiments.

LIST OF REFERENCE SIGNS

1: incubator
2: reaction container
3: shared disk
4: reagent bottle
5: sample container
8: dispensing mechanism
9: dispensing mechanism
17: transfer mechanism
20: reaction container tray
21: disposal box
100: controller

What is claimed is:

1. An automatic analyzer comprising:
a controller configured to control analysis of a sample;
a container retaining mechanism on which a plurality of containers is loadable at a plurality of positions;
a dispensing mechanism configured to dispense the sample and a reagent to the container;
a detection mechanism configured to detect a component from a reaction solution prepared by dispensing the sample and the reagent to the container; and
a transfer mechanism configured to transfer the container when the container is to be loaded at a position on the container retaining mechanism and when the container at the position is to be disposed of to a disposal box,
wherein: the dispensing mechanism includes a liquid surface detection mechanism configured to detect a liquid surface of a liquid in the container;
the controller uses the dispensing mechanism at a prescribed timing to detect presence or absence of the liquid surface at a target position on the container retaining mechanism and the controller determines a state including presence or absence of the container accommodating the reaction solution; and
the controller performs control in which the controller performs operation of the disposal using the transfer mechanism at the position when the controller determines a state in which the container is present, and the controller does not perform operation of the disposal using the transfer mechanism at the position when the controller determines a state in which the container is not present; and the automatic analyzer further comprising
a container presence/absence detection mechanism configured to detect presence or absence of the container at the position on the container retaining mechanism,
wherein the controller performs control in which the controller determines a state in which the container is not present when the liquid surface is not detected and the container presence/absence detection mechanism does not detect the container, the controller determines a state in which the container that is unused is present when the liquid surface is not detected and the container presence/absence detection mechanism detects the container, and the controller does not perform operation of the disposal using the transfer mechanism and operation of loading the container that is new and the container is used in subsequent analysis at the position when a state is determined in which the container that is unused is present.

2. The automatic analyzer according to claim 1, wherein: the dispensing mechanism includes an abnormal lowering detection mechanism configured to detect an abnormality of a nozzle in lowering;
the controller uses the dispensing mechanism at the prescribed timing to detect an abnormality in lowering the nozzle at a target position on the container retaining mechanism and the controller determines a state including presence or absence of the container; and
the controller performs control in which the controller determines a state in which the container is not present when the liquid surface is not detected and the container is not detected, the controller determines a state in which the container that is unused is present when the liquid surface is not detected and the container is detected, the controller determines a state in which the container that is used is present when the liquid surface is detected, and the controller does not perform operation of the disposal using the transfer mechanism and operation of loading the container that is new are not performed and the container is used in subsequent analysis at the position when a state is determined in which the container that is unused is present.

3. The automatic analyzer according to claim 1, wherein at the position when a state is determined in which the container is not present, the controller performs control in which the controller performs operation of loading the container that is new using the transfer mechanism prior to subsequent analysis.

4. The automatic analyzer according to claim 1, wherein the prescribed timing includes time of activation of the analyzer and time of resumption of analyzer operation after halt of analyzer operation due to detection of an analyzer abnormality.

5. The automatic analyzer according to claim 1, wherein the liquid surface detection mechanism is a mechanism configured to detect presence or absence of the liquid surface based on a change in electrostatic capacitance corresponding to a contact of a nozzle of the dispensing mechanism with the liquid surface.

6. The automatic analyzer according to claim 1, wherein the abnormal lowering detection mechanism is a mechanism configured to detect a state of the abnormality based on detection of a contact of the nozzle of the dispensing mechanism with a bottom face of the container or with another object.

7. The automatic analyzer according to claim 1,
wherein the controller causes the nozzle of dispensing mechanism to make access to a predetermined position on the container retaining mechanism at the prescribed timing to rotate the container retaining mechanism, and all positions or a part of positions in the plurality of positions is in turn moved to the predetermined position.

* * * * *